United States Patent
Ive et al.

[19]

[11] Patent Number: 5,810,461
[45] Date of Patent: Sep. 22, 1998

[54] METHODS AND APPARATUS FOR ORGANIZING THE ELECTRIC CABLES OF PERIPHERAL EQUIPMENT ATTACHED TO A COMPUTER HOUSING

[75] Inventors: Jonathan Ive, San Francisco; Ronald J. Moller, Boulder Creek, both of Calif.

[73] Assignee: Apple Computer, Inc., Cupertino, Calif.

[21] Appl. No.: 779,742

[22] Filed: Jan. 7, 1997

[51] Int. Cl.$^6$ ................................................. A47B 81/00
[52] U.S. Cl. ..................... 312/223.6; 439/942; 361/827; 220/3.8; 220/242; 312/265.6
[58] Field of Search .................... 70/58, 164, 159, 70/160, 161, 162, 168, 18; 174/65 G, 65 R; 439/942, 371; 361/826, 827, 829; 312/223.1, 223.2, 223.6, 265.5, 265.6, 263; 248/68.1; 220/3.8, 242, 241

[56] References Cited

U.S. PATENT DOCUMENTS

| | | | |
|---|---|---|---|
| 2,531,110 | 11/1950 | Cisler | 312/223.6 X |
| 3,278,066 | 10/1966 | George et al. | 220/241 |
| 3,341,268 | 9/1967 | Bickford | 312/223.1 X |
| 3,523,156 | 8/1970 | Philips, Jr. | 174/65 G |
| 4,748,540 | 5/1988 | Henneberg et al. | 361/724 X |
| 4,898,009 | 2/1990 | Lakoski et al. | 70/168 X |
| 4,985,695 | 1/1991 | Wilkinson et al. | 70/58 X |
| 5,018,052 | 5/1991 | Ammon et al. | 361/724 X |
| 5,142,442 | 8/1992 | Daniels et al. | 361/724 X |
| 5,228,319 | 7/1993 | Holley et al. | 70/58 |
| 5,233,881 | 8/1993 | Sayen et al. | 248/68.1 X |
| 5,568,362 | 10/1996 | Hansson | 312/223.6 X |

*Primary Examiner*—Peter M. Cuomo
*Assistant Examiner*—Janet M. Wilkens
*Attorney, Agent, or Firm*—Burns, Doane, Swecker & Mathis, L.L.P.

[57] ABSTRACT

A personal computer includes an outer wall having plug receptacles adapted to receive the plug-in cables of peripheral equipment such as keyboards, modems, printers, etc. The outer wall carries a comb element which forms a row of slots into which respective cables can be inserted. The slots serve to organize the cables which otherwise would tend to lay haphazardly on the computer support surface. A cover is pivotably mounted on the outer wall to extend across the slots. A cover extension can be snapped onto the cover to cover the plug receptacles.

9 Claims, 3 Drawing Sheets

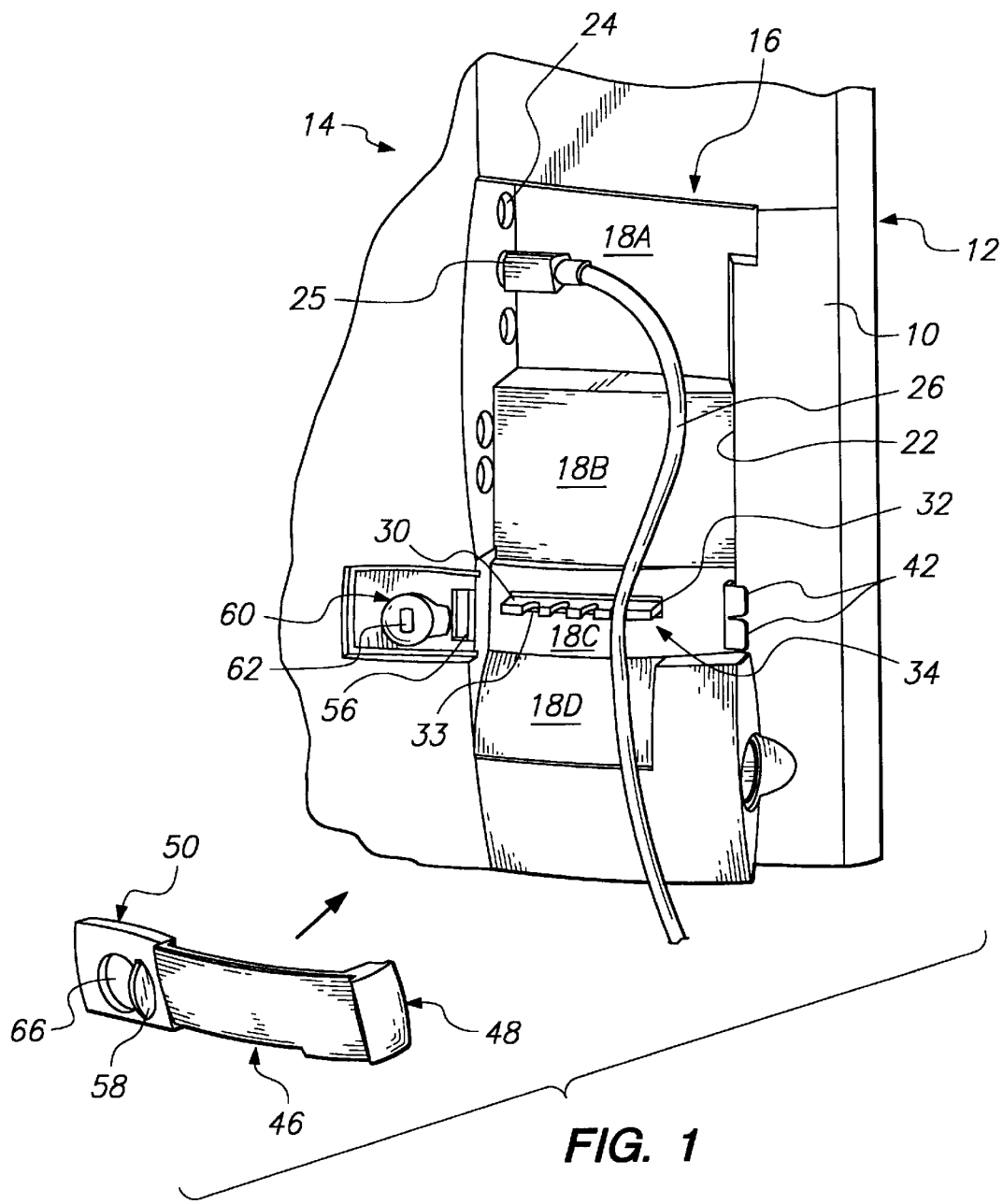
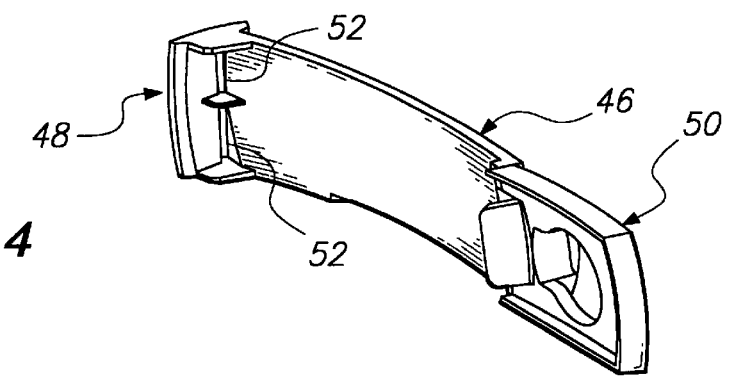
FIG. 1
FIG. 4

METHODS AND APPARATUS FOR ORGANIZING THE ELECTRIC CABLES OF PERIPHERAL EQUIPMENT ATTACHED TO A COMPUTER HOUSING

BACKGROUND OF THE INVENTION

The present invention relates to methods and apparatus for organizing the electric cables of peripheral equipment plugged into a computer housing.

It is conventional to provide a personal computer with peripheral equipment, such as keyboards, modems, monitors, printers, etc., which have electric cables that plug into receptacles provided in the computer housing. Those cables tend to lay haphazardly across the desktop and contribute to clutter, as well as detracting from the overall appearance of the computer.

It would be desirable to organize those cables into a neater arrangement, and to dress out the appearance of the computer housing to which the cables are plugged.

SUMMARY OF THE INVENTION

Those and other objects are achieved by the present invention which relates to a personal computer that comprises a housing having an outer wall. The outer wall includes a plurality of plug receptacles adapted to receive the electric plug-in cables of peripheral equipment. Slots are disposed on the outer wall at a location spaced from the receptacles, the slots adapted to receive intermediate portions of the electric cables. A cover is attachable to the outer wall in a position covering at least the slots.

The slots are preferably formed by a comb element which is mounted in a slit formed in the outer wall. The comb element is preferably formed of an elastic material to hold the cable therein by friction. A cover extension could be mounted on the cover to extend across the plug receptacles.

The present invention relates to a method of orienting an electric cable that is plugged into a plug receptacle formed in an outer wall of a personal computer. The method comprises inserting an intermediate portion of the electric cable into one of a plurality of slots formed on the outer wall, and positioning a cover on the outer wall to cover at least the slots.

BRIEF DESCRIPTION OF THE DRAWINGS

The objects and advantages of the invention will become apparent from the following detailed description of preferred embodiments thereof in connection with the accompanying drawing in which like numerals designate like elements and in which:

FIG. 1 is an exploded perspective view of a fragmentary portion of a rear wall of a computer housing, with an electric cable of peripheral equipment plugged into the rear wall, and with a gate or cover in the process of being installed onto the rear wall;

FIG. 4 is a rear perspective view of the gate depicted in FIG. 1;

DETAILED DESCRIPTION OF PREFERRED EMBODIMENTS OF THE INVENTION

Figure 2:
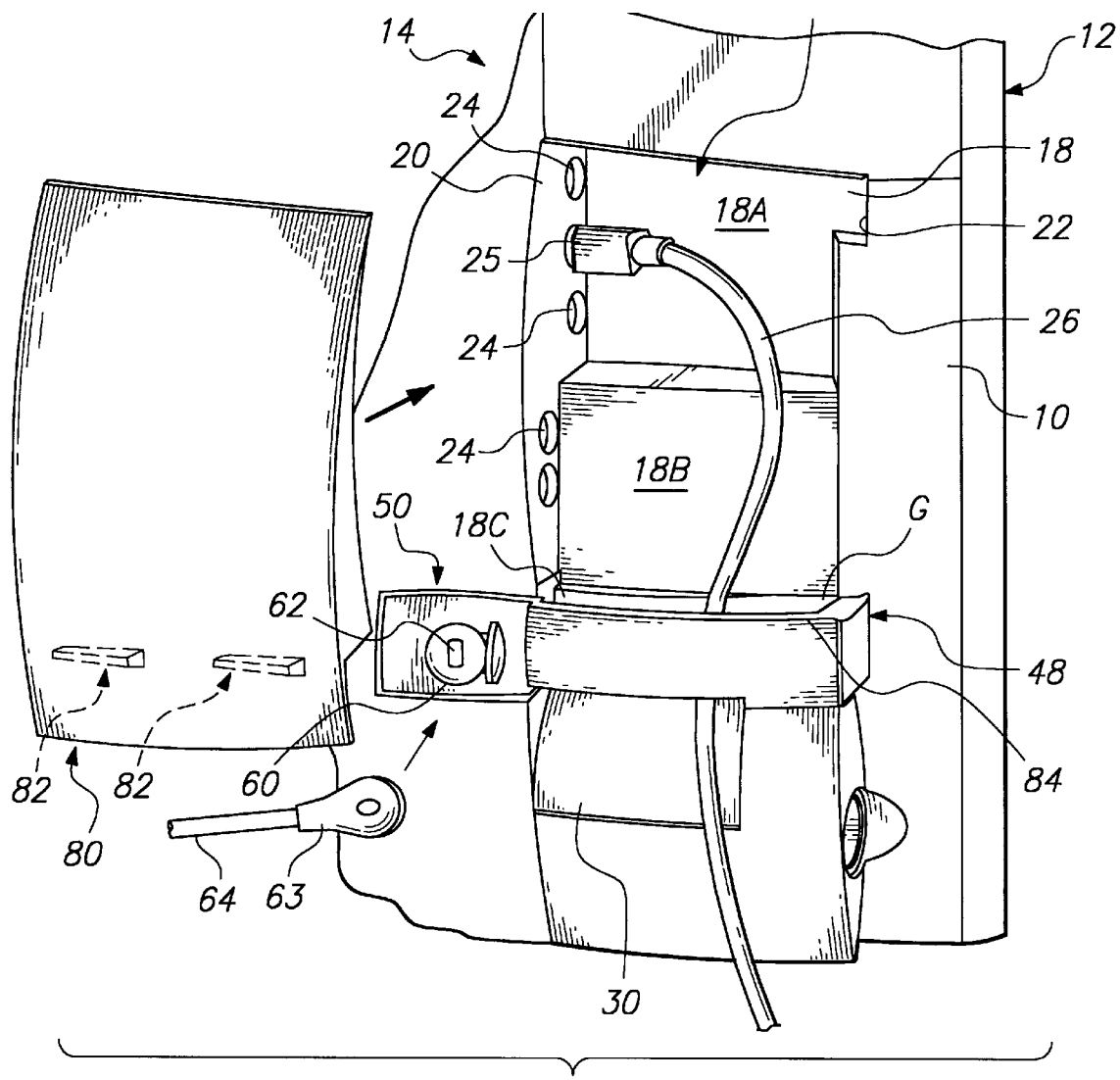
FIG. 2 is a view similar to FIG. 1 depicting the gate in its installed condition, and further depicting a locking cable and a cover in the process of being installed.
Figure 5:
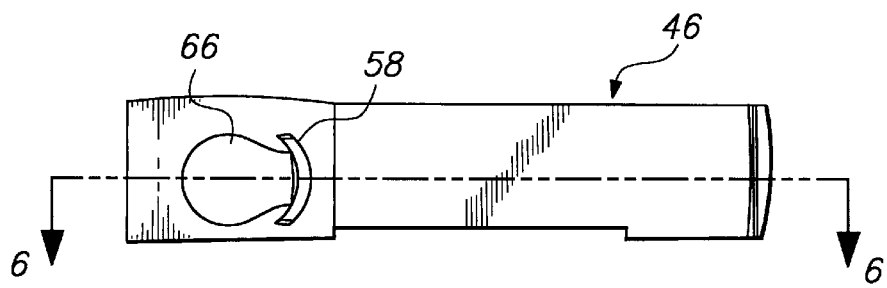
FIG. 5 is a front elevational view of the gate.

Depicted in FIG. 1 is an external side of a rear panel 10 of a housing 12 of a personal computer 14. A recess 16 formed in that external side includes a stepped end wall 18 and a pair of side walls 20, 22. The end wall 18 is stepped to form vertically adjacent portions 18A, 18B, 18C and 18D. Situated in the side wall 20 are plug receptacles 24 adapted to receive plugs 25 of electric cables 26 of peripheral equipment such as a keyboard, modem, monitor, printer, etc. (only one such cable being depicted). The recess 16 thus forms an area in which the electric cables are disposed. The bottom portion 18D of the end wall 18 forms an opening through which the electric cable projects.

Figure 6:
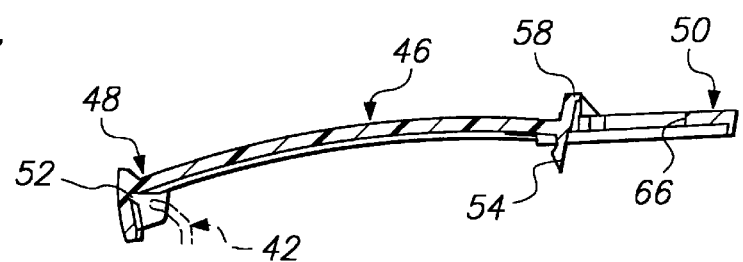
FIG. 6 is a sectional view taken along the line 6—6 in FIG. 5.

Situated in the portion 18C of the end wall 18 is a horizontal slit 32 (see FIG. 1) which is adapted to receive a slotted element or comb 34 which is connected, e.g., by friction fit, within the slit 32. The comb 34, which is also shown in FIG. 6, forms a plurality of slots 33 sized to receive the electric cables by friction fit. The comb is preferably formed of an elastic material such as plastic or rubber. By running the cables through the comb, the cables become more organized, and manageable, besides improving the overall appearance of the computer area.

Formed along an edge 40 of one of the side walls 22 of the housing are two fingers 42 which extend in a direction away from the other side wall 20. A securing member in the form of a cover or gate 46 is adapted to be mounted to the fingers 42. The gate 46, which is depicted in FIGS. 1, 2, 4 and 5, includes opposite ends 48, 50. The end 48 constitutes a hinge end, and the other end 50 constitutes a locking end. The hinge end includes a pair of recesses 52 (see FIGS. 4 and 6) adapted to receive respective ones of the fingers 42 to define therewith a hinge enabling the gate to be swung between open and closed positions. The recesses 52 are separated from each other by a flange 55 which is sized to enter a space formed between the fingers 42 in order to guide the gate during its rotation.

In its closed position, the gate extends across a portion of the recess 16 in which the comb 34 is mounted as shown in FIG. 2, the gate thus functioning to cover the comb. The gate 46 thus forms with the portion 18C of the end wall 18 a gap G that is narrower than the plug 25 of the electric cable 26. Thus, with the cable 26 situated between the gate 46 and end wall 18, the cable 26 cannot be separated from the housing 12. If desired, the gate 46 could be configured to lie closely adjacent a front edge 30 of the comb 34 when the gate is in its closed position, to prevent the cable from becoming dislodged from its respective slot 33.

The locking end 50 of the gate includes a flexible latch finger 54 which is adapted to enter a recess 56 formed in the panel 10 when the gate 46 is closed. The latch finger 54 engages behind a shoulder (not shown) disposed in the recess 56 in order to yieldably (e.g. frictionally) retain the gate in a closed position. A rib 58 formed on the gate enables a user to grip the gate to swing it open.

The panel 10 includes a projection 60 having an opening 62 formed therein which is adapted to receive an external locking element 63 of a conventional anchoring cable device 64, such as a Kensington security lock for example, in order to fixedly anchor the computer housing 12 to a stationary structure such as a wall. Basically, the locking element 63 includes a key-actuated T-bar (not shown) which enters the opening 62 of the projection 60 and becomes locked to the projection when rotated by ninety degrees with a special key (not shown).

The locking end 50 of the gate includes a hole 66 large enough to receive the projection 60 but smaller than the locking element 63 of the anchoring device 64. Thus, by locking the locking element 63 to the housing 12 while the gate 46 is closed, the housing 12 is anchored to a support, and simultaneously the gate is locked to the housing.

In that way, not only is the housing secured against theft, but the peripheral equipment is locked to the housing 12 by the closed gate 46. Separation of the peripheral equipment from the housing cannot be accomplished without cutting the respective electric cable, thus deterring such theft.

If desired, a cover extension element 80 can be attached to the gate 46 to overlie the plug receptacles 24 and the upper end of the electric cable and present a neater appearance. The cover extension 80 can be attached to the gate in any suitable way, such as by a snap fit produced by elastic fingers 82 (see FIG. 2) which grip an upper edge 84 of the gate 46.

To utilize the present invention, a user connects the electric cables 26 of peripheral equipment to the computer housing 12 by plugging the plugs 25 into respective receptacles. Intermediate sections of the cables are inserted into respective slots 33 of the comb 34 to present an organized appearance (see FIG. 1).

Then the gate 46 is installed by inserting the hinge fingers 42 into the respective recesses 52, thereby forming a hinge about which the gate can be swung to its closed position (FIG. 2). In the closed position of the gate, the locking element 63 of the cable anchoring device 64 can be connected to the projection 60 of the housing, to anchor the housing 12 to a support and simultaneously lock the gate 46 to the housing 12. Since the gap G formed between the gate 46 and the wall section 18C is narrower than the plugs 25 of the electric cables, the electric cables cannot be separated from the housing 12.

Figure 3:
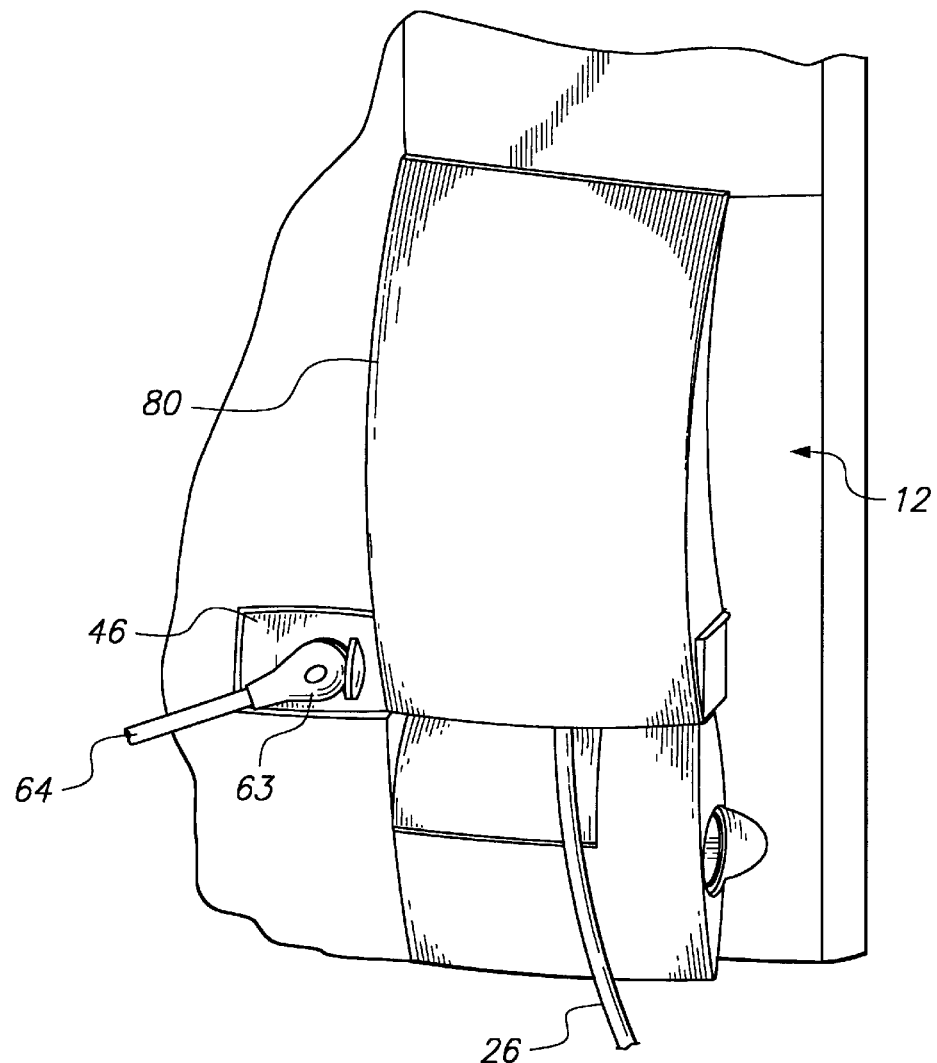
FIG. 3 is a view similar to FIG. 2 after the cover and locking cable have been installed.
Figure 7:
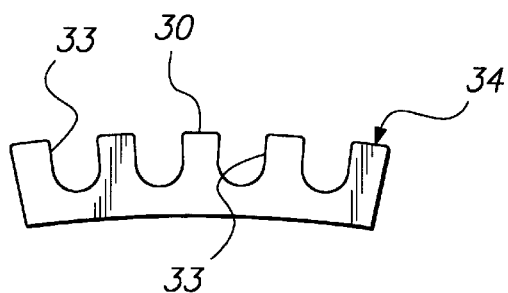
FIG. 7 is a plan view of a comb member depicted in FIG. 1.

If a yet neater appearance is desired, the cover extension 80 can be snapped onto the gate 46 (FIG. 3) to conceal the upper portions of the cables.

It will be appreciated that the gate 46 need not be locked to the housing by a housing-anchoring device. Instead, the gate 46 could be locked to the housing by any suitable lock, and the housing could, or could not, be anchored. The gate 46 need not be mounted by a hinge; any type of mounting, whether swingable or not, could be utilized for the gate.

If the gate-locking feature were not desired, the gate could be employed simply to function as a cover to conceal the comb and as a carrier for the cover extension 80.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A personal computer comprising:

a housing including an outer wall having a plurality of plug receptacles adapted to receive electric plug-in cables of peripheral equipment;

a plurality of slots disposed on the outer wall at a location spaced from the receptacles, the slots adapted to receive intermediate portions of respective electric cables; and a cover attachable to the outer wall in a position covering at least the slots;

wherein the slots include open ends arranged in a row, the cover extending across the row of open ends when in a closed position and being oriented to retain the cables in the slots.

2. The personal computer according to claim 1 including a comb element mounted to the outer wall, the comb element forming the slots.

3. The personal computer according to claim 2, wherein the outer wall has a slit formed therein, the comb element mounted in the slit.

4. The personal computer according to claim 3, wherein the comb element is formed of an elastic material and is adapted to hold the cables by friction.

5. The personal computer according to claim 1, wherein the cover is swingably mounted on the outer wall.

6. A method of orienting an electric cable that is plugged into a plug receptacle formed in an outer wall of a personal computer, comprising the steps of:

A) inserting an intermediate portion of the electric cable into one of a plurality of slots formed on the outer wall;

B) positioning a cover on the outer wall to cover at least the slots and to retain the electric cable within the slot: and (C) attaching a cover extension to the cover for covering the plug receptacle.

7. A personal computer comprising:

a housing including an outer wall having a plurality of plug receptacles adapted to receive electric plug-in cables of peripheral equipment;

a plurality of slots disposed on the outer wall at a location spaced from the receptacles, the slots adapted to receive intermediate portions of respective electric cables;

a cover attachable to the outer wall in a position covering at least the slots; and a cover extension adapted to be removably mounted on the cover for covering the plug receptacles.

8. A personal computer comprising:

a housing including an outer wall having a plurality of plug receptacles adapted to receive electric plug-in cables of peripheral equipment;

a plurality of slots disposed on the outer wall at a location spaced from the receptacles, the slots adapted to receive intermediate portions of respective electric cables; and a cover attachable to the outer wall in a position covering at least the slots;

wherein the cover is oriented to retain the cables in the slots when the cover is in its closed position.

9. A personal computer comprising:

a housing including an outer wall having a plurality of plug receptacles adapted to receive electric plug-in cables of peripheral equipment;

a plurality of slots disposed on the outer wall at a location spaced from the receptacles, the slots adapted to receive intermediate portions of respective electric cables;

a cover attachable to the outer wall in a position covering at least the slots;

wherein the slots include open ends arranged in a row, the cover extending across the row of open ends; and a cover extension adapted to be removably mounted on the cover for covering the plug receptacles.

* * * * *